INVENTOR.
John M. Pozar
BY Lawler + Lawler
Attys.

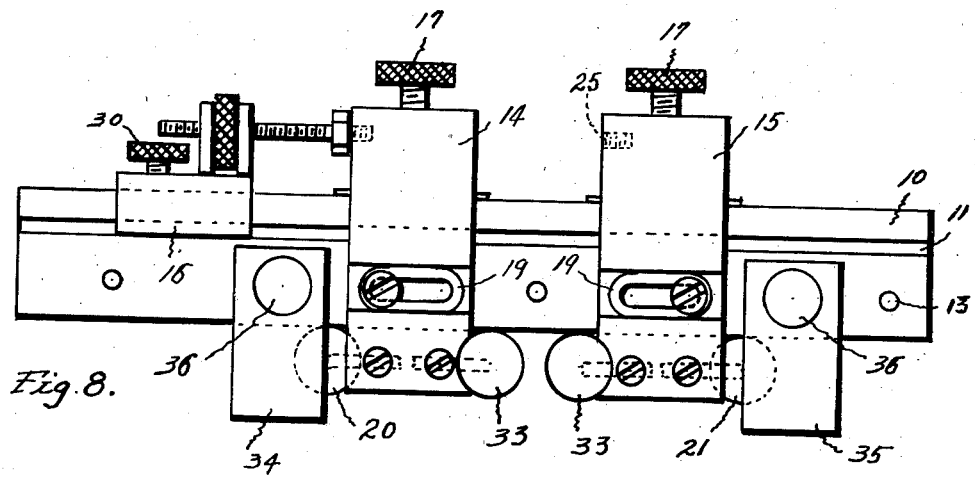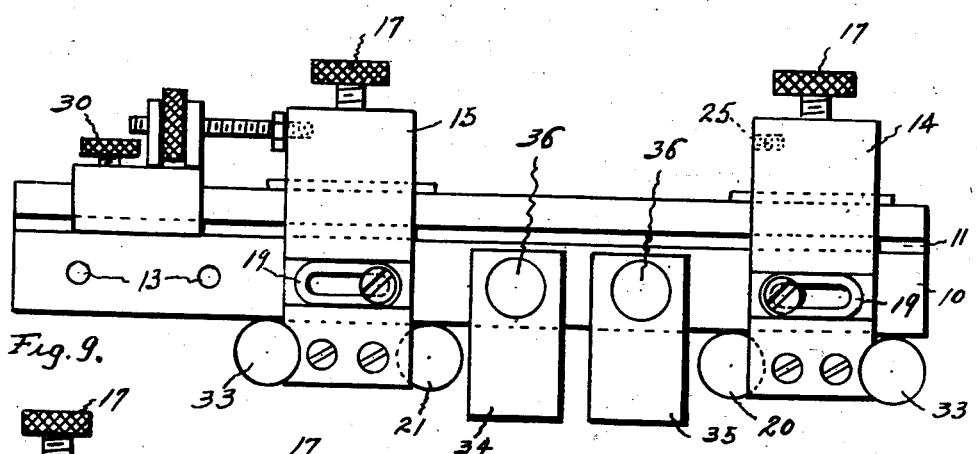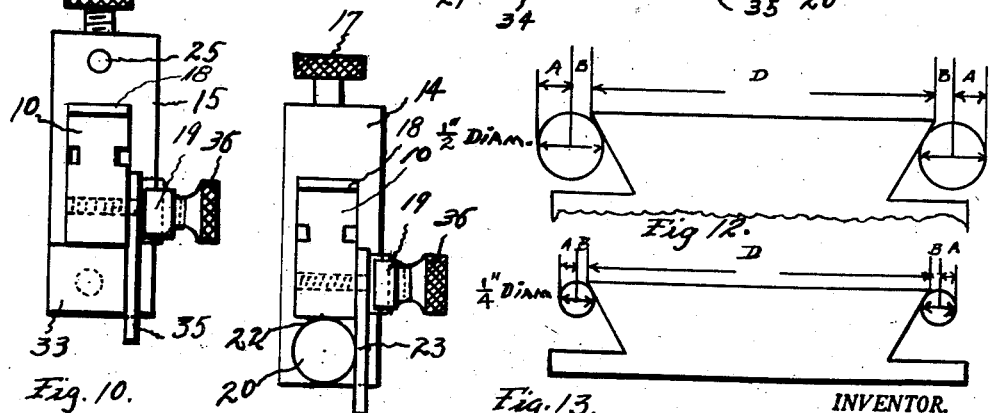

Inventor:
John M. Pozar
By Lawler + Lawler.
Attorneys.

Patented Dec. 2, 1947

2,431,826

UNITED STATES PATENT OFFICE 2,431,826

DOVETAIL MEASURING DEVICE

John M. Pozar, Cleveland, Ohio

Application April 14, 1944, Serial No. 531,004

2 Claims. (Cl. 33—143)

This invention relates to improvements in a dovetail measuring device which is used to measure and check dovetails, encountered in machine shop practice.

One of the most important objects of the invention is to provide a compact device of the character described which will afford means for conveniently and efficiently determining the exact measurements of the various dovetails and gibs encountered in machine shop practice.

Other objects and advantages reside in certain novel features of construction, arrangement and combination of parts, which will hereinafter be more fully described and pointed out in the appended claims.

Referring to the accompanying explanatory drawings, wherein similar reference characters designate corresponding parts throughout the several views:

Figure 8 is a side elevational view of a variant of the device, and showing the jaws, each being provided with a plug and a ball and showing the flush plates mounted in one position on the beam.

Figure 9 is a side elevational view of the variant shown in Figure 8, the jaws being reversed on the beam, and showing the flush plates in another position on the beam.

Figure 10 is an end view of one of the jaws showing the relation of the flush plate on the beam to a plug.

Figure 11 is an end view of one of the jaws showing the relation of the flush plate on the beam to a sphere or ball.

Figure 12 is a diagrammatic view showing the relation of the balls or plugs to a male dovetail and the method that may be used to set the members on the jaws over which a measurement may be taken.

Figure 13 is a diagrammatic view showing the use of smaller plugs or ball which may be used on the jaws if desired.

Figure 1:
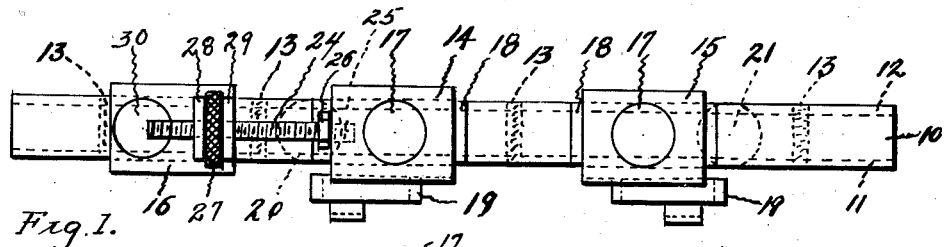
Figure 1 is a plan view of the device.

Referring to the drawings, the beam 10 is of ample length and is provided with longitudinally extending grooves 11 and 12 throughout its entire length. In the beam there is also provided at spaced intervals screwthreaded through bores 13.

On the beam there are adjustably mounted two jaws 14 and 15 and an auxiliary jaw 16.

The jaws 14 and 15 are similar in construction and may be interchangeably mounted on the beam. Each of the jaws is provided with a thumb screw 17, a flat spring 18, and a slidably mounted adjustable secondary contact 19 over which a measurement may be taken when the jaws are set on the beam for checking or measurement.

In the face of each jaw there is provided a longitudinally extending groove in which the measuring contact 19 is adjustably mounted. The measuring contact may be of a link configuration having parallel sides that fit in the groove with a frictional sliding fit, and may be provided with semi-circular ends. The measuring contact is provided with an elongated slot, and it is held in adjusted position in the groove by means of a suitable screw as shown in the several views in the drawings.

The measuring contacts project above the surface of the face of the jaw in which they are mounted so that they may be contacted by the engaging portions of a caliper device, so that a measurement may be taken thereover or in between them, in making measurements of the angularly disposed surfaces.

To illustrate the use of the measuring contacts:

Take for example, Figure 12 where a male dovetail is shown, the size of the balls and the distance D being given, A is one-half the diameter of the ball, and B is the perpendicular distance from the extended vertical radius of the ball to the corner of the dovetail. Now even before the dovetail measuring device is applied to the work, it may be set as follows: One of the jaws being set on the beam, the other jaw being free to move in or out, is moved in the proper direction so that the measurement between the center of the balls reads to the dimension D plus B plus B and is then locked on the beam. The measuring contacts 19 are now moved to read to the same measurement, and locked in their adjusted position. The auxiliary member is now brought in to play, it being understood that it is locked on the beam by the set screw 30, and the jaw cooperating with it is free to move on the beam. The knurled nut 27 on the screw 24 is turned to bring the measuring contact to the exact desired reading as determined by a micrometer caliper, and is then locked. It is apparent that the setting of the measuring contacts and the balls are equal, because it is the same as if the measurement was taken if the balls alone were used because the distance D plus B plus B is the same over the measuring contacts.

Below the beam in each jaw there is removably mounted a primary contact member comprising a sphere or ball of predetermined size as at 20 and 21. The ball in each jaw is mounted so that it is tangent to the face of the bottom edge of the beam and has a point of tangency flush with a side face thereof as shown in Figure 11 at 22 and 23.

One of the jaws is provided with a micrometer screw 24. This screw is screwed into the jaw as at 25, and is provided with a shoulder 26 to accommodate a wrench for that purpose. The screw extends longitudinally and is provided with a knurled threaded nut 27 that is mounted between the upstanding spaced lugs 28 and 29 integral with the auxiliary jaw. The auxiliary jaw is provided with a thumb screw 30 to hold it in place on the beam. The auxiliary jaw is also provided with two inturned flanges 31 and 32 adapted to engage in the grooves in the beam to hold it thereon.

Figure 2:
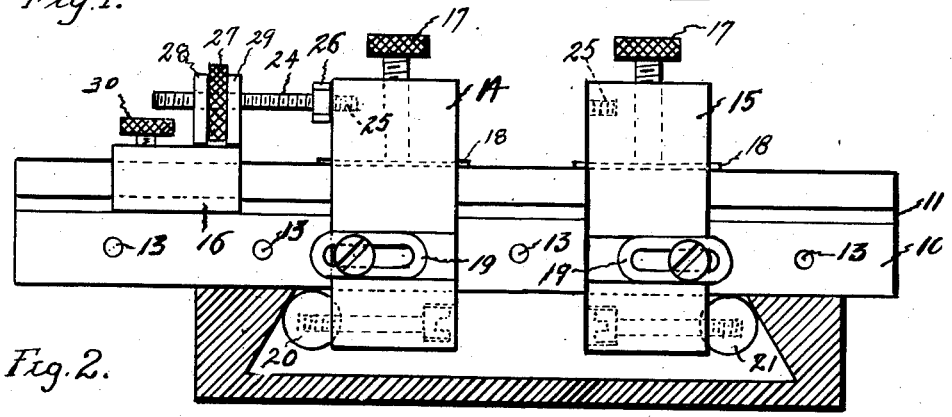
Figure 2 is a side elevational view of the device showing its application to a female dovetail; the dovetail is shown in section.
Figure 3:
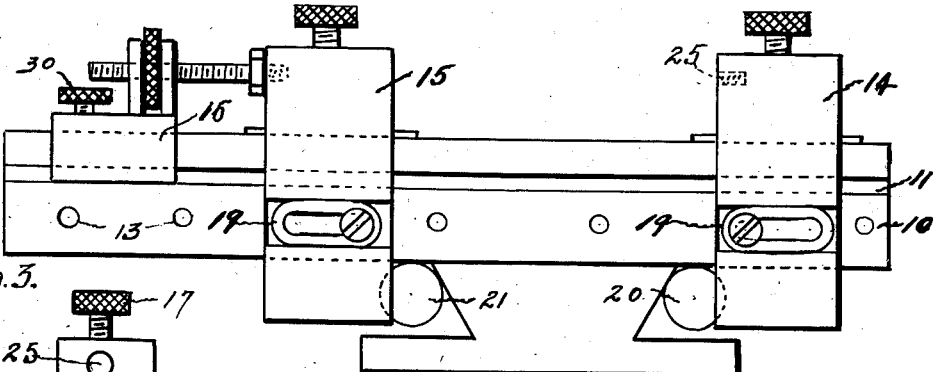
Figure 3 is a side elevational view of the device showing its application to a male dovetail.

In the variant shown in Figures 8 and 9, the jaws on the device are the same in all respects to the jaws shown in Figures 1, 2 and 3, with the sole exception that the jaws are each provided with a detachably mounted plug 33 as well as a ball, and hence it is thought that further description is unnecessary because in the several views such parts as are alike or which have the same function as similar parts in the foregoing views are numbered with the same numbers for easy identification. The flush plates 34 and 35 are shown in Figures 8 and 9 in different positions on the beam to illustrate how they may be interchangeably mounted on the beam to meet the various requirements of practice. The flush plates are held in place by means of thumb screws 36 that engage in the screwthreaded bores in the beam.

Figure 14:
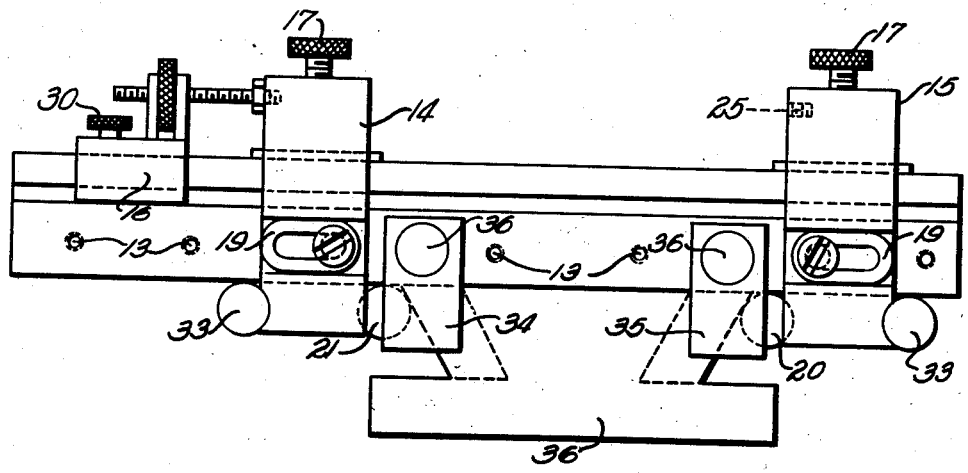
Fig. 14 is an end view of the wide end of a male tapered dovetail showing the application of the flush plates in relation thereto.
Figure 15:
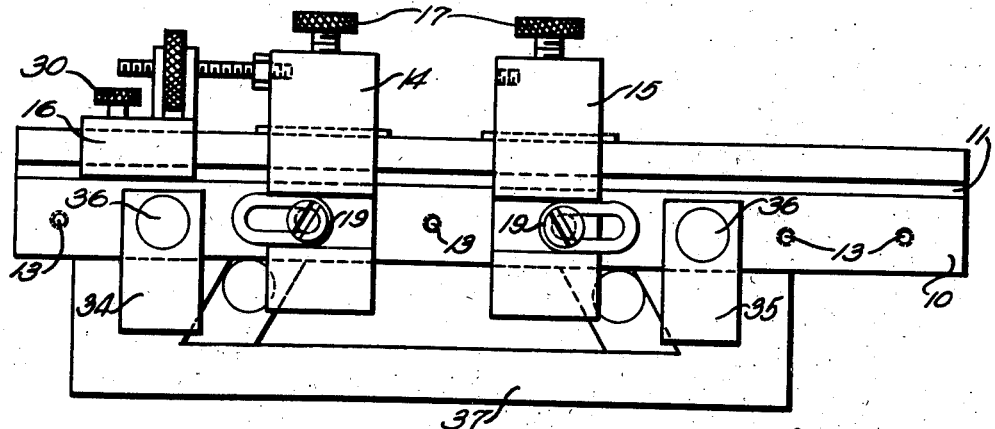
Fig. 15 is an end view of the wide end of a female tapered dovetail showing the application of the flush plates in relation thereto and in operative location on the measuring instrument.

The use of the flush plates can be understood from a consideration of Figures 14 and 15; in Figure 14 the flush plates 34 and 35 are shown in position against the wide end of a male tapered dovetail, and in Figure 15 the flush plates are shown in position against the wide end of a female dovetail. Obviously the plates may be positioned against the end plane of a dovetail to align the ball contacts for measurement of the narrow end of the respective dovetails shown as well as the wide end thereof.

Figures 4, 5, 6, 7:
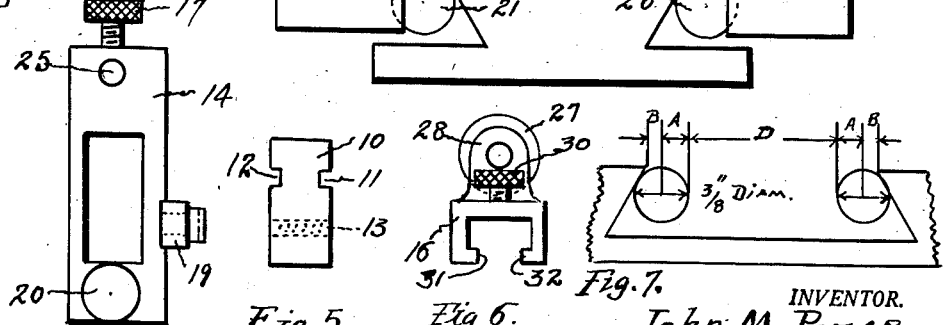
Figure 4 is an end elevational view of one of the jaws of the device and illustrating the mounting of a sphere or ball thereon, and its relative position with reference to the beam opening therethrough.
Figure 5 is an end view of the beam showing the relative position of the grooves therein.
Figure 6 is an end view of the auxiliary jaw, and showing the flanges that engage in the slots or grooves in the beam.
Figure 7 is a diagrammatic view showing the relation of the balls to a female dovetail, and the method that may be used to position the members on the jaws over which a measurement may be taken.

In the diagrammatic views shown in Figures 7, 12 and 13, D is the distance usually given on dovetail drawings in shop practice, A in all cases shown is one-half of the diameter of the ball or plug, B in all cases is the perpendicular distance to the corner of the dovetail from the extended vertical radius of the ball or plug. The distance B in all cases, the size of the ball or plug being given, is given in the formula usually found in the machinists' handbook or in the mechanics' reference book, and is well understood by those skilled in the art.

The operation of the device is as follows:

Take for example Figure 7, a female dovetail, the size of the balls and the distance D between them being given, the jaws are set to the distance D on the beam, then the slidably mounted adjustable secondary contact 19 in the jaws over which the measurement is taken are set so that they read to the exact distance of D plus A plus A plus B plus B or to the distance of D plus A plus A. Now if the dovetail has been machined accurately the balls will enter the dovetail with a snug fit, if undersize they will not enter, then the jaw operatively connected to the jaw on the beam is adjusted to determine just how much material remains to be removed to bring it to the given dimension. If oversize the balls will enter freely, the jaw is then adjusted and a reading taken to show just how much oversize. With the information thus obtained the male can be machined to fit or vice versa.

It will be apparent to those skilled in the art that the invention is applicable to the various types of dovetails and gibs, and gibs in combination with dovetails, of external, internal, tapered and round of general and special tapers.

I am aware that my invention may be embodied in other specific forms with out departing from the spirit or essential attributes thereof; and I therefore desire the present embodiment to be considered in all respects as illustrative and not restrictive, reference being had to the appended claims rather than to the foregoing description to indicate the scope of the invention.

Having thus described the invention, what is claimed as new and desired to be secured by Letters Patent is:

1. A measuring instrument of the class described for use with angularly disposed surfaces, comprising, in combination a beam having a longitudinally extending groove formed in each side face thereof adjacent its top face, two jaws slidably mounted on the beam, each of the aforesaid jaws being provided with a longitudinally extending groove in a face thereof, an elongated secondary measuring contact member adjustably mounted in the longitudinally extending groove in the face of each jaw, a sphere removably mounted in each jaw and positioned laterally on the jaw and having a point of tangency with the bottom face of the beam, and having a point of tangency flush with a side face of the beam, said spheres serving as primary measuring contacts for engaging said angular surfaces proper, an auxiliary jaw having inturned flanges slidably engaging in the longitudinally extending grooves in the side faces of the beam, a longitudinally extending screw positioned above the beam detachably connected to one of the jaws and extending laterally therefrom, a knurled threaded nut cooperating with the aforesaid screw and auxiliary jaw, the adjustably mounted secondary measuring contacts serving for use so that the engaging portions of a caliper device when spanned over the ends thereof may effect a measurement indicative of the actual distance between the angularly disposed surfaces at their respective points of tangency with the spheres, from which indicative measurement the distance between the sharp corners of the angularly disposed surfaces may be computed.

2. A measuring instrument of the class described for use with angularly disposed surfaces, comprising, in combination, a beam having a longitudinally extending groove formed in each side face thereof adjacent to the face of the top edge of the beam and having below the aforesaid grooves throughout its length at spaced intervals through screw-threaded bores therein, two jaws slidably mounted on the beam, each of the aforesaid jaws being provided with a longitudinally extending groove in a face thereof, an elongated secondary measuring contact member adjustably mounted in the longitudinally extending groove in the face of each jaw, a sphere removably mounted in each jaw and positioned laterally of the jaw and having a point of tangency with the bottom face of the beam, and having a point of tangency flush with a side face of the beam, said spheres serving as primary measuring contacts for engaging said angular surfaces proper, an auxiliary jaw having inturned flanges slidably engaging in the longitudinally extending grooves in the side faces of the beam, a longitudinally extending screw positioned above the beam detachably connected to one of the jaws and extending laterally therefrom, a knurled threaded nut cooperating with the aforesaid screw and auxiliary jaw, flush plates of quadrilateral configuration and having plane surfaces detachably connected to the beam by means of screws engaging in the threaded bores in the beam, the flush plates being adapted to seat against the end plane of a dovetail and hold the primary contacts in measuring alignment adjacent the end plane of the dovetail, the adjustably mounted secondary measuring contacts serving for use so that the engaging portions of a caliper when spanned over the ends thereof may effect a measurement indicative of the actual distance between the angularly disposed surfaces at their respective points of tangency with the spheres, from which indicative measurement the distance between the sharp corners of the angularly disposed surfaces may be computed.

JOHN M. POZAR.

REFERENCES CITED

The following references are of record in the file of this patent:

FOREIGN PATENTS

| Number | Country | Date |
| --- | --- | --- |
| 111,749 | Great Britain | 1917 |
| 349,467 | Germany | 1922 |